2,753,351

4,4' - DIOXY - DIPHENYL - QUINOLYL - METHANES AND 4,4' - DIOXY - DIPHENYL - ISOQUINOLYL - METHANES AND METHOD OF MAKING THE SAME

August Kottler and Ernst Seeger, Biberach (Riss), Germany, assignors to Dr. Karl Thomae, G. m. b. H., Biberach (Riss), Germany, a firm No Drawing. Application September 8, 1953,
Serial No. 379,055

Claims priority, application Germany September 9, 1952

6 Claims. (Cl. 260—287)

It is known that unsubstituted diphenyl-(quinolyl-6)-methane can be produced by warming 4-amino-triphenyl methane with glycerine, nitrobenzol and concentrated sulphuric acid (Fischer and Fränkel, B. 19, 749).

Also, compounds of the type of substituted amino-diphenyl-quinolyl-methanes are known. For example, Howitz and Philipp (A. 396, 32) described the bis-(4-dimethyl-amino-phenyl) - (quinolyl - 6) - methane, and Howitz and Schwenk (B. 38, 1283) described the bis-(4-dimethylaminophenyl)-(quinolyl - 8) - methane by heating the corresponding aldehyde with dimethyl-aniline and zinc chloride. As to other compounds of this type reference is made to Noelting (B. 24, 3141); Dey and Dutt (J. Indian Chem. Soc. 5, 535/1928; C. 1929/I, 755); Ray (J. Indian Chem. Soc. 14, 414/1937; C. 1938/I, 183); and Kausche, Hahn and Schleith (Zt. f. Naturforschung, 5b, 88/1950).

It has now been found that the therapeutically valuable 4,4'-dioxy - diphenyl - quinolyl - methanes and 4,4'-dioxy - diphenyl - iso - quinolyl - methanes which show especially favorable laxative properties may be produced in well crystallized form and with good yields by condensing quinoline- or isoquinoline - aldehydes or ketones with phenols which have a hydrogen atom in p-position, which permits condensation, in the presence of water removing substances.

The process of the present invention may be carried out with unsubstituted as well as with alkyl, aryl or aralkyl substituted quinoline- or isoquinoline-aldehydes or ketones. The phenols may be mono- or poly-phenols, the hydroxyl groups of which may be fully or partially alkylated or acylated. Also, the phenols may be substituted by alkyl, aryl or aralkyl groups. The acylation or alkylation of the hydroxyl groups may take place before or after the condensation.

In the condensation there may be used for the removal of water preferably sulphuric or phosphoric acids. But such substances as hydrochloric acid, zinc chloride, tin tetrachloride, phosphorus halides, phosphorus pentoxide, boron trifluoride, aluminum chloride and the like are applicable.

The reaction may conveniently be conducted in the presence of solvents, such as benzene, toluene and the like. Cooling and agitation are suitably applied. Under certain circumstances it may be convenient to conduct the condensation at room temperature or with moderate warming.

The following examples will fully illustrate the process of the present invention:

EXAMPLE 1

(4,4'-dioxy-diphenyl)-(quinolyl-2)-methane

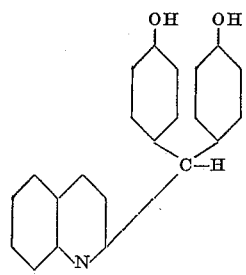

To 65 g. quinoline-2-aldehyde and 120 g. phenol there is added 65 cc. concentrated sulphuric acid while permanently agitating and cooling, whereby rapid condensation results. After standing for several hours, the mass is introduced into an aqueous solution of sodium carbonate. The separated crystalline mass is removed by suction, dissolved in hot methanol and water is added until the mixture becomes turbid. The crystals which precipitate on cooling are recrystallized from ethanol. One obtains colorless crystals melting at 246° C.

EXAMPLE 2

(4,4' - dioxy - 3,3' - dimethyl - diphenyl) - (quinolyl - 2)-methane

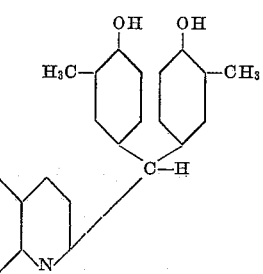

A mixture of 50 g. quinoline-2-aldehyde and 100 g. o-cresol is reacted with the portionwise addition of 50 cc. concentrated sulphuric acid with agitation and cooling, whereby thickening takes place soon. The reaction mixture is allowed to stand for several hours, is taken up in methanol and introduced into sodium carbonate solution. The precipitate is separated by suction and recrystallized from hot methanol. One obtains colorless crystals melting at 264°–265° C.

EXAMPLE 3

(4,4' - dioxy - diphenyl) - (6 - methyl - quinolyl - 2)-methane

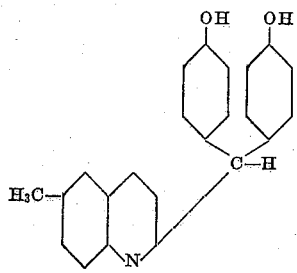

To a mixture of 26 g. 6-methyl-quinoline-2-aldehyde and 45 g. phenol, 30 g. of crystallized phosphoric acid are added, and the mixture is heated for one hour to about 50° C. with stirring. It is allowed to stand overnight, the mixture is taken up in methanol and the solution introduced into sodium carbonate solution. The resulting precipitate is reprecipitated from methanol by the addition of water. After drying it is triturated with ether and recrystallized from aqueous ethanol. One obtains almost colorless crystals melting at 239°–240° C.

EXAMPLE 4

*(4,4'-dioxy-diphenyl)-(quinolyl-2)-methyl-methane*

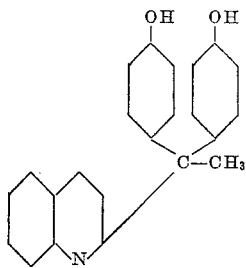

40 g. 2-acetyl quinoline and 80 g. phenol are reacted with 80 cc. concentrated sulphuric acid with agitation and cooling. The reaction mixture is allowed to stand for several days with occasional stirring, is dissolved in ethanol and neutralized with sodium bicarbonate solution. The resulting precipitate is recrystallized from ethanol. One obtains colorless crystals melting at 228° C.

EXAMPLE 5

*(4,4'-dioxy-diphenyl)-(isoquinolyl-3)-methane*

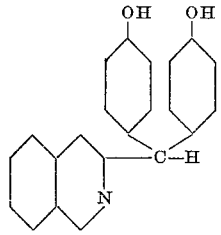

One proceeds in the same manner as is set forth in Example 1 with the application of isoquinoline-3-aldehyde. One obtains colorless crystals melting at 232° C.

EXAMPLE 6

*(4,4'-dioxy-diphenyl)-(isoquinolyl-1)-methane*

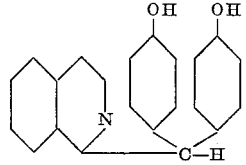

Into a mixture of 70 g. isoquinoline-1-aldehyde and 140 g. phenol there is stirred with cooling and slowly 140 cc. concentrated sulphuric acid. The mass is allowed to stand several hours, is then dissolved in methanol and introduced into sodium bicarbonate solution. The precipitate is dissolved in 5% aqueous sodium hydroxide, diluted with water, and reacted with sufficient diluted hydrochloric acid until the initial precipitate is again dissolved. At this point it is neutralized with sodium bicarbonate. The precipitated and dried material is triturated several times with ether and recrystallized from hot, aqueous ethanol. One obtains almost colorless crystals melting at 254° C.

EXAMPLE 7

*(4,4'-dioxy-diphenyl)-(isoquinolyl-1)-methyl-methane*

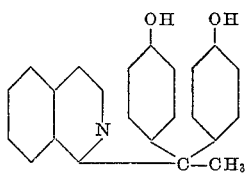

Into a mixture of 24 g. 1-acetylisoquinoline and 50 g. phenol, 100 cc. concentrated sulphuric acid are introduced with stirring and cooling. In order to complete the reaction, the mixture is allowed to stand for several days, after which it is dissolved in dilute sodium hydroxide solution with cooling. After filtering the solution, so much dilute hydrochloric acid is added until the initial precipitate is again dissolved. The solution is neutralized with sodium carbonate and the precipitate obtained thereby recrystallized from hot, aqueous ethanol. One obtains colorless crystals melting at 185° C.

EXAMPLE 8

*(4,4'-dioxy-3,3'-dimethoxy-diphenyl)-(quinolyl-2)-methane*

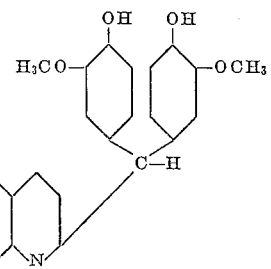

70 g. quinoline-2-aldehyde and 170 g. guaiacol are mixed and, with cooling and agitation, reacted with concentrated sulphuric acid added portionwise. The honey-like reaction mixture is allowed to stand for several hours, then is dissolved in methanol, and the raw product is precipitated by agitation in soda solution. In order to purify it, the raw product is dissolved in methanol, precipitated with water, the dried precipitate treated warm with carbon tetrachloride, and recrystallized from benzol. One obtains colorless crystals melting at 177° C.

EXAMPLE 9

*(4,4'-diacetoxy-diphenyl)-(quinolyl-2)-methane*

20 g. (4,4'-dioxy-diphenyl)-(quinolyl-2) methane are suspended in 300 cc. acetic acid anhydride and reacted by dropwise addition of concentrated sulphuric acid, until the solution is complete. The mixture is allowed to stand for some time, then most of the acetic acid anhydride is distilled off in a vacuum, and the mixture neutralized with sodium bicarbonate solution. The separated solid reaction product is treated with 1% sodium hydroxide solution, with water and dilute alcohol. One obtains a colorless substance melting at 110°–115° C.

EXAMPLE 10

*(4,4'-dimethoxy-diphenyl)-(quinolyl-4)-methane*

5 g. of quinoline-4-aldehyde are warmed with 7,5 g. of anisole whereby solution occurs. 10 cc. of concentrated sulphuric acid is added slowly at a temperature not exceeding 40° C. After standing for one day the reaction mixture is dissolved in 50 cc. of methanol and the solution is poured into soda solution. The thus formed colorless precipitate is filtered with suction and washed with water. For purification the dried product is dissolved in hot benzene and then petrol ether is added. The formed precipitate is removed by suction and again triturated with ether. Melting point=202–205° C.

EXAMPLE 11

(4,4'-dioxy-3,3'-diisopropyl-6,6'-dimethyl-diphenyl)-(quinolyl-4)-methane

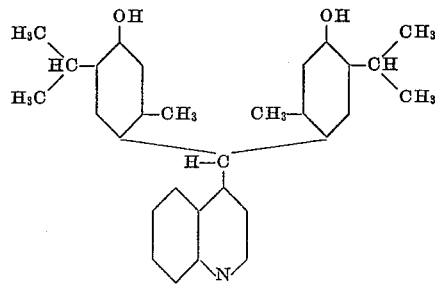

To 15 g. of thymol and 20 cc. of concentrated sulphuric acid there are added 5 g. of quinoline-4-aldehyde with cooling. After standing for one day with occasional stirring the mixture is dissolved in 75 cc. of methanol and introduced into soda solution. The formed precipitate is filtered with suction and washed with water. For purification the raw product is triturated with ether, dissolved in methanol, boiled with charcoal and filtered. Water is added until the mixture becomes turbid. One obtains yellowish crystals melting at 220–223° C.

EXAMPLE 12

(4,4'-dioxy-3,3'-diphenyl-diphenyl)-(quinolyl-4)-methane

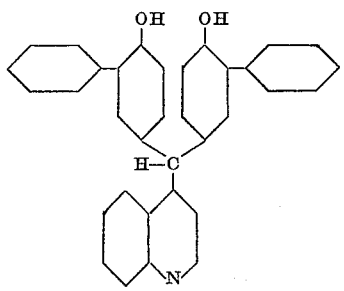

Into a warmed mixture of 2,5 g. of quinoline-4-aldehyde and 5,5 g. of o-oxydiphenyl, 10 cc. of concentrated sulphuric acid are added with stirring. After standing overnight the solidified mass is dissolved in 50 cc. of methanol and neutralized with soda solution. The white precipitate is filtered with suction and washed with water. For purification the raw product is dissolved in methanol, precipitated with few water and after drying taken up in hot benzene. When adding a little petroleum ether, yellowish crystals melting at 198–200° C. are obtained.

EXAMPLE 13

(4,4'-dioxy-3,3'-dibenzyl-diphenyl)-(quinolyl-4)-methane

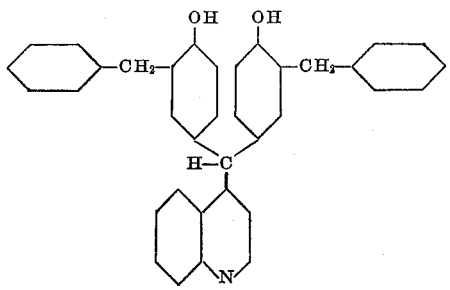

5 g. of quinoline-4-aldehyde are dissolved in 13 g. of o-benzylphenol with gentle warming. There are added 10 cc. of concentrated sulphuric acid with cooling and stirring. After standing for one day the solid condensation product is dissolved in methanol and introduced into soda solution. Thereby a flaky precipitate is formed, which is filtered by suction and washed with water. The product is purified by recrystallisation from methanol/water and then from glacial acetic acid/water. Melting point=187–190° C.

Instead of the sulphuric acid and phosphoric acid one can also use in the above examples as water removing substance hydrochloric acid, zinc chloride, tin tetrachloride, phosphorus halides, phosphorus pentoxide, boron trifluoride and aluminum chloride.

What is claimed is:

1. Compounds having the following general formula:

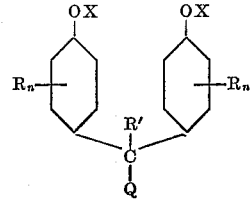

wherein R represents a member of the group consisting of alkyl, phenyl, benzyl, alkoxy, and hydrogen radicals, X represents a member of the group consisting of hydrogen, alkyl and acyl radicals, R' represents a member of the group consisting of hydrogen and alkyl, Q represents quinoline, isoquinoline, and quinoline and isoquinoline having on the ring at least one alkyl radical, and $n$ represents a number from 1 to 4, the alkyl and acyl radicals having 1 to 6 carbon atoms.

2. 4,4'-dioxy-diphenyl-quinolyl-methanes.
3. (4,4'-dioxy-diphenyl)-(quinolyl-2)-methane.
4. (4,4'-dioxy-diphenyl)-(quinolyl-2)-methyl-methane.
5. (4,4'-dioxy-diphenyl)-(isoquinolyl-1)-methane.
6. (4,4'-diacetoxy-diphenyl)-(quinolyl-2)-methane.

No references cited.